US006034793A

United States Patent [19]

Park

[11] Patent Number: 6,034,793

[45] Date of Patent: Mar. 7, 2000

[54] ROLLER ASSEMBLY USED FOR THE IMAGE READING UNIT OF A FACSIMILE MACHINE

[75] Inventor: Heon-Soo Park, Suwon, Rep. of Korea

[73] Assignee: SamSung Electronics Co., Ltd., Suwon, Rep. of Korea

[21] Appl. No.: 08/834,536

[22] Filed: Apr. 4, 1997

[30] Foreign Application Priority Data

Apr. 4, 1996 [KR] Rep. of Korea .................... 96-10238

[51] Int. Cl.[7] .......................... H04N 1/04; B65G 13/02

[52] U.S. Cl. .................................... 358/498; 198/780

[58] Field of Search ............................ 358/498, 474, 358/496; 271/109; 492/59; 198/780; 193/37

[56] References Cited

U.S. PATENT DOCUMENTS

| | | | |
|---|---|---|---|
| 3,994,380 | 11/1976 | Hope et al. | 198/780 |
| 4,823,689 | 4/1989 | Kishino et al. | 492/59 |
| 5,278,677 | 1/1994 | Lee et al. . | |
| 5,325,213 | 6/1994 | Takahashi et al. . | |
| 5,421,441 | 6/1995 | Mason | 193/37 |
| 5,550,652 | 8/1996 | Park . | |
| 5,552,902 | 9/1996 | Kohno . | |
| 5,579,099 | 11/1996 | Nishiyama et al. . | |
| 5,606,430 | 2/1997 | Morikawa et al. . | |

*Primary Examiner*—Scott Rogers
*Attorney, Agent, or Firm*—Robert E. Bushnell, Esq.

[57] ABSTRACT

A roller assembly used for the image reading unit of a facsimile machine, comprises a white roller assembly made of an extruded pipe. The white roller assembly (which can be a rubber roll) is directly extruded so as to be formed to a cylindrical pipe which doesn't need to be subjected to an additional machining process. The assembly is provided with hooking grooves on the insides of both ends. Both shafts support the rotating white roller and are separately formed by molding so as to be each inserted into the respective ends on both sides of the white roller. One of the shafts is integrally formed with a gear without requiring an E-ring, and a hooking jaw is formed on both shafts so as to be fitted into the hooking groove formed inside both ends of the white roller.

23 Claims, 3 Drawing Sheets

ROLLER ASSEMBLY USED FOR THE IMAGE READING UNIT OF A FACSIMILE MACHINE

CLAIM OF PRIORITY

This application makes reference to, incorporates the same herein, and claims all benefits accruing under 35 U.S.C. §119 from an application entitled ROLLER ASSEMBLY USED FOR THE IMAGE READING UNIT OF A FACSIMILE MACHINE earlier filed in the Korean Industrial Property Office on Apr. 4, 1996, and there duly assigned Ser. No. 10238/1996 by that Office.

BACKGROUND OF THE INVENTION

1. Field of the Invention

The present invention relates to a roller assembly used for the image reading unit of a facsimile machine. More particularly, the present invention relates to a white roller assembly made of an extruded pipe.

2. Description of the Related Art

A fax ("facsimile") machine scans an original document, transmits an image of the document to a remote fax receiver, and reproduces the received image on a printer of the receiver. The image reading unit of a facsimile transmitter typically employs a contact image sensor (hereinafter referred to as "CIS") or a reduced optical system, thereby reading information on the original documents and converting them into electrical signals. Since the original document moves through the optical image reading path, the focus must be adjusted accurately in order to read out the sharpest possible image of the original documents. To guarantee such functions, such as the precision reading and accurate transportation of the optical image reading unit, a rubber roller (which can be a "white roller") is often employed, thereby precisely focusing on and accurately conveying the original documents. In the prior art, this rubber roller (which we may term "transportation roller") has a shaft running through the roller. This preference for a single shaft is expressly shown in the contemporary practice of image reading units of facsimile machines. On this matter, Morikawa et al. (U.S. Pat. No. 5,606,430, Image Reading Apparatus Having Projections On Surface Of Hopper Near Side Edges Of Paper Feed Path To Prevent Close Contact And Reduce Static Electricity, Feb. 25, 1997) discusses documents being sequentially taken out by a coaction of a paper feeding roller. Nishimiya et al. (U.S. Pat. No. 5,579,099, Document Conveying Device And Document Reading Device Operable Therewith, Nov. 26, 1996) discusses a document device for conveying a document in a reciprocating motion. Kohno (U.S. Pat. No. 5,552,902, Facsimile Apparatus With Internal Mechanisms For Conveying Originals And Recording Paper, Sep. 3, 1996) discusses reducing cost, size, and weight by reducing the number of motors. Park (U.S. Pat. No. 5,550,652, Automatic Document Feeder For A Facsimile Machine, Aug. 27, 1996) discusses automatic document feeding with a rotating shaft coupled to the ADF roller. Takahashi et al. (U.S. Pat. No. 5,325,213, Image Reader And Book Document Reader With A Page Turning Capability For An Image Forming Apparatus, Jun. 28, 1994) discusses page turning in an image reader for reading a book document laid on a document table in a spread position by optically scanning the surface of the document. Lee et al. (U.S. Pat. No. 5,278,677, Device For Removing Document Jamming Generated At A Transmitter Of A Facsimile Using A Contact Image Sensor, Jan. 11, 1994) discusses removing document jamming generated at a platen roller. From my study of the contemporary art and practice, I find that there is a need for roller assembly for an image reading unit of a facsimile machine that uses more than one shaft. This would give advantages, among others, of convenient manufacture.

SUMMARY OF THE INVENTION

Therefore, it is an object of the invention to provide a white roller assembly which can be easily processed and assembled. This may reduce the manufacturing cost.

To achieve the above object and others of the present invention, the white roller (rubber roller) is formed of an extruded pipe and provided with hooking grooves inside of both ends of the roller. Also, the roller shaft is molded to form two separated end-shafts supporting both ends of the roller, and the end-shafts are each inserted separately into both ends. The two end-shafts are each provided with hooking jaws and one of the end-shafts is formed integrally with a gear.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 1A and 1B are schematic diagrams illustrating the image reading unit of the optical image reading system employing the contemporary white roller for a facsimile machine, wherein FIG. 1A illustrates the image reading unit employing a contact image sensor, and FIG. 1B illustrates the image reading unit employing a reduced optical system;

DETAILED DESCRIPTION OF THE PREFERRED EMBODIMENT(S)

Figure 1A:
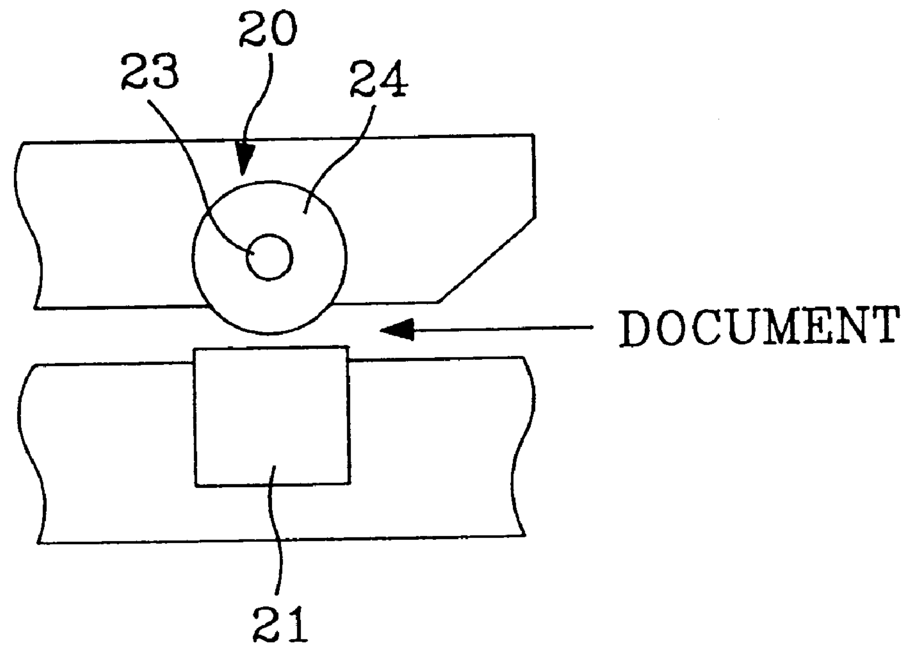
Figure 1B:
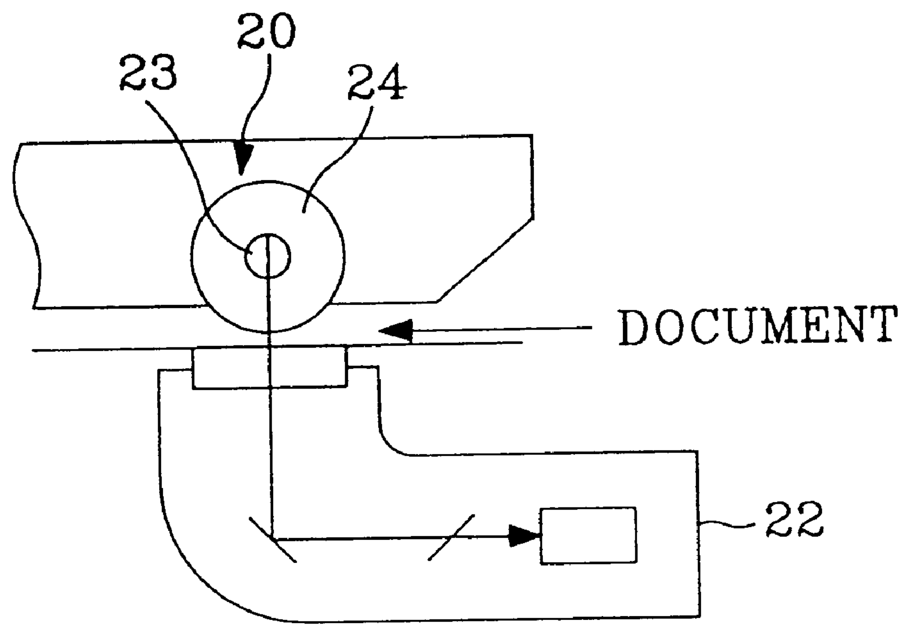
Figure 2:
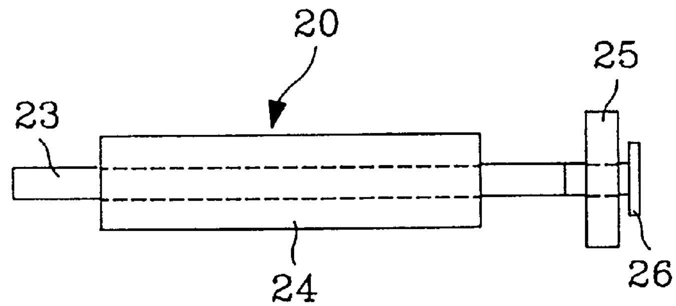
FIG. 2 is a longitudinal sectional view of the contemporary white roller assembly used for the image reading unit.

Referring to FIGS. 1A, 1B and 2, the contemporary white roller 20 is installed so as to contact with a CIS 21 or a reduced optical system 22. The white roller 20 consists of a steel shaft 23 and a white rubber roller 24 formed around on the surface of the steel shaft 23.

Regarding the manufacturing process of the white roller, after the steel shaft 23 is machined, the white rubber roller 24 is formed around the cylindrical surface of the steel shaft 23. Then, it is subjected to the final machining and finishing work. Further, in order to drive the completed white roller 20, a gear 25 is inserted into one side of the white roller 20, and a E-ring 26 is mounted on the shaft outside of the gear 25 to retain it in position. Thereafter, the assembled white roller 20 is installed in the facsimile machine so as to contact with the CIS 21 or the reduced optical system 22, so that the white roller 20 enables the precise focusing on and accurate conveying of the original documents.

As previously mentioned, the contemporary white roller has the drawbacks that after the steel shaft is machined, the rubber roller is formed on the steel shaft and subjected to the final machining and work for cutting the cylindrical surface of the rubber roller. Also, after mounting the gear on the shaft, an E-ring must be mounted on the shaft outside of the gear to retain the gear in position, which requires a lot of complicated machining, finishing and assembling processes. In particular, the contemporary white roller needs various machine parts such as steel shaft, rubber roller, gear and E-ring for the manufacturing process and requires an additional process for controlling the precision tolerance and removing of foreign materials like dust affecting the image reading, which consequently results in the increase of the manufacturing cost and thus the price increase of the white roller.

Figure 3:
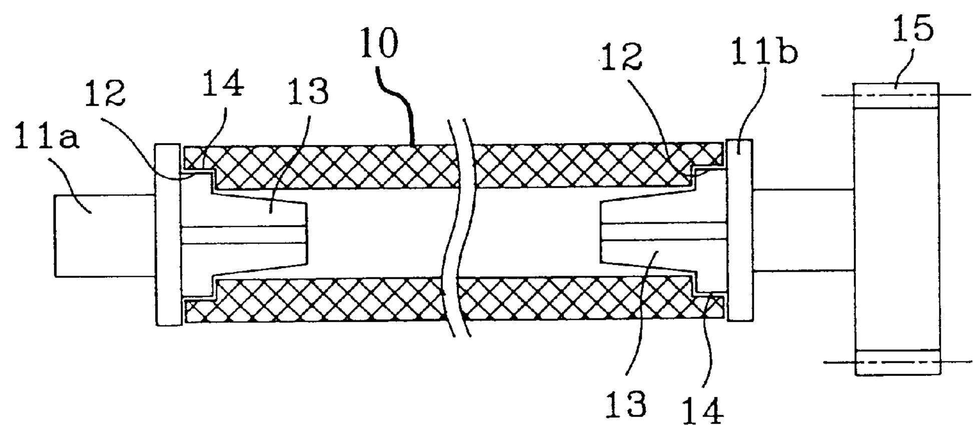
FIG. 3 is a longitudinal sectional view of the roller assembly of the image reading unit according to the present invention.
Figure 4:
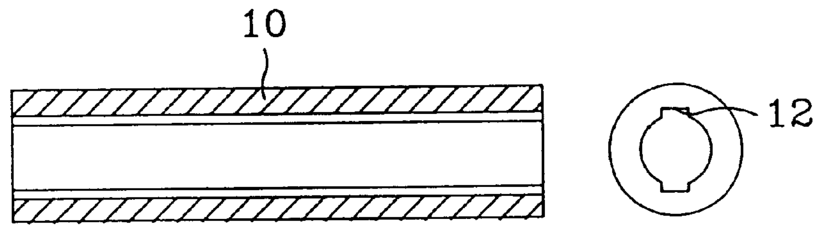
FIG. 4 is a longitudinal sectional view of the white roller along with other essential parts of the roller assembly shown in FIG. 3.
Figure 5:
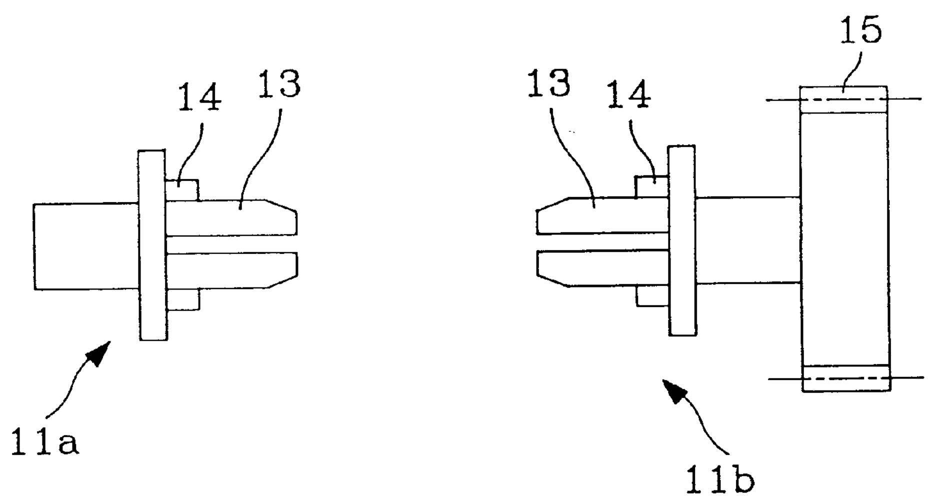
FIG. 5 is a longitudinal sectional view of the shafts along with other essential parts of the roller assembly shown in FIG. 3.

FIGS. 3, 4, and 5 illustrate a different approach. The roller assembly of the image reading unit of the facsimile consists of an extruded white roller 10 and the molded shafts 11*a* and 11*b* to be inserted into respective ends on both sides of the white roller 10. FIG. 4 shows the white roller 10. The white roller 10 is formed of an extruded pipe which is provided with the hooking grooves 12 on the insides of both ends of the roller 10 for preventing the idling motion of the shaft 11*a*, 11*b*. Referring to FIG. 5, the shafts 11*a*, 11*b* are separately molded and are each inserted into respective ends of the white roller 10.

The shafts 11*a*, 11*b* are both provided with elastic shaft fixing trunks 13 to be forcibly inserted into the respective ends of the white roller 10, and further provided with the hooking jaws 14 on the shaft fixing trunks 13 to be fitted into the hooking grooves 12 as shown in FIGS. 3, 5. In addition the gear 15 is formed integrally with one of the shafts 11*a* or 11*b* to drive the roller 10. Further, the fore-ends of the shaft fixing trunks 13 are chamfered to be smoothly inserted into the white roller 10.

The operation and effect of the roller assembly of the image reading unit of the facsimile machine can be as follows.

During assembly, the shaft fixing trunks 13 of the shafts 11*a*, 11*b* each are forcibly inserted into respective ends of the white roller 10 so that the hooking jaws 14 are engaged with the hooking grooves 12, respectively, whereby the shaft fixing trunks 13 are elastically fitted into both ends of the white roller 10 so as to be seated firmly inside thereof. The completed roller assembly 20 of the image reading unit is installed in the facsimile machine so that the gear 15 of the roller assembly 20 is accurately geared with the driving gear of the facsimile drive system(not shown in the drawings). The above roller assembly 20 performs the functions of conveying the original document accurately and focusing the image reading unit precisely on the original document.

Thus, the white roller assembly (rubber roll) according to the present invention is directly extruded to be formed to a cylindrical pipe which doesn't need to be subjected to an additional machining process and provided with the hooking grooves on the insides of both ends thereof. Both shafts for supporting the rotating white roller are separately formed by molding so as to be each inserted into the respective ends on both sides of the white roller, wherein one of the shafts is integrally formed with a gear without requiring the E-ring, and a hooking jaw is formed on both shafts to be fitted into the hooking groove formed inside of both ends of the white roller. Hence, the present invention has the advantage that the manufacturing and assembly processes are simplified, which results in the reduction of the production cost.

What is claimed is:

1. A roller assembly for an image reading unit of a facsimile machine, comprising:

a transportation roller having a cylindrical pipe with a first end and a second end, said transportation roller providing a surface for the image reading unit, and conveying a document;

a first shaft inserted into said first end of said transportation roller, and supporting said transportation roller during rotation; and a second shaft inserted into said second end of said transportation roller, and supporting said transportation roller during rotation;

wherein said first shaft has a first elastic fixing trunk forcibly inserted and elastically fitted into said first end of said transportation roller.

2. The roller assembly of claim 1, wherein said first shaft has a first hooking jaw preventing rotation during an idle state of said transportation roller.

3. The roller assembly of claim 2, wherein said transportation roller has a first hooking groove inside said first end of said transportation roller, said first hooking jaw of said first shaft being inserted into said first hooking groove.

4. The roller assembly of claim 1, wherein said second shaft has a second elastic shaft fixing trunk forcibly inserted and elastically fitted into said second end of said transportation roller, has a second hooking jaw preventing rotation during an idle state of said transportation roller, and is formed integrally with a gear for driving said transportation roller.

5. The roller assembly of claim 4, wherein said transportation roller has a second hooking groove inside said second end of said transportation roller, said second hooking jaw of said second shaft being inserted into said second hooking groove.

6. The roller assembly of claim 4, wherein a front end of said second elastic shaft fixing trunk is chamfered for smooth insertion into said second end of said transportation roller.

7. A roller assembly for an image reading unit of a facsimile machine, comprising:

a transportation roller having a cylindrical pipe with first and second ends, said transportation roller providing a reading surface for the image reading unit, and conveying a document; and first and second shafts inserted into said first and second ends, respectively, of said transportation roller, and supporting said transportation roller during rotation;

wherein said first shaft has a first hooking jaw preventing rotation during an idle state of said transportation roller.

8. The roller assembly of claim 7, wherein said transportation roller is formed by extrusion.

9. The roller assembly of claim 7, wherein said first and second shafts are separated, and each shaft is separately inserted into a respective one of said two ends of said transportation roller.

10. The roller assembly of claim 9, wherein said shafts are formed by molding.

11. The roller assembly of claim 7, wherein said first shaft has a first elastic shaft fixing trunk forcibly inserted and elastically fitted into said first end of said transportation roller.

12. The roller assembly of claim 7, wherein said transportation roller has a first hooking groove inside said first end of said transportation roller, said first hooking jaw of said shaft being inserted into said first hooking groove.

13. The roller assembly of claim 11, wherein a front end of said first elastic shaft fixing trunk is chamfered for smooth insertion into said first end of said transportation roller.

14. The roller assembly of claim 7, wherein said second shaft has a second elastic shaft fixing trunk forcibly inserted and elastically fitted into said second end of said transportation roller, has a second hooking jaw preventing rotation during an idle state of said transportation roller, and is formed integrally with a gear for driving said transportation roller.

15. The roller assembly of claim 14, wherein said transportation roller has a second hooking groove inside said second end of said transportation roller, said second hooking jaw of said second shaft being inserted into said second hooking groove.

16. The roller assembly of claim 14, wherein a front end of said second elastic shaft fixing trunk is chamfered for smooth insertion into said second end of said transportation roller.

17. A roller assembly for an image reading unit of a facsimile machine, comprising:

a transportation roller formed of a cylindrical pipe for conveying a document to serve as an image reading surface;

a first shaft inserted into a first end of said transportation roller to support said transportation roller for rotation; and a second shaft inserted into a second end of said transportation roller to support said transportation roller for rotation, and provided with a gear for driving said transportation roller;

wherein said first shaft has a first elastic shaft fixing trunk forcibly inserted and elastically fitted into said first end of said transportation roller, and has a first hooking jaw preventing rotation during an idle state of said transportation roller.

18. The roller assembly of claim 17, wherein said transportation roller has a first hooking groove inside said first end of said transportation roller, said first hooking jaw of said shaft being inserted into said first hooking groove.

19. The roller assembly of claim 17, wherein a front end of said first elastic shaft fixing trunk is chamfered for smooth insertion into said first end of said transportation roller.

20. The roller assembly of claim 17, wherein said second shaft has a second elastic shaft fixing trunk forcibly inserted and elastically fitted into said second end of said transportation roller, has a second hooking jaw preventing rotation during an idle state of said transportation roller, and is formed integrally with said gear for driving said transportation roller.

21. The roller assembly of claim 20, wherein said transportation roller has a second hooking groove inside said second end of said transportation roller, said second hooking jaw of said second shaft being inserted into said second hooking groove.

22. The roller assembly of claim 20, wherein a front end of said first elastic shaft fixing trunk is chamfered for smooth insertion into said second end of said transportation roller.

23. A roller assembly for an image reading unit of a facsimile mahcine, comprising:

a transportation roller having a cylindrical pipe with a first end and a second end, said transportation roller providing a surface for the image reading unit, and conveying a document;

a first shaft inserted into said first end of said transportation roller, and supporting said transportation roller during rotation; and a second shaft inserted into said second end of said transportation roller, and supporting said transportation roller during rotation;

wherein said first shaft has an elastic fixing trunk which is chamfered for smooth insertion into said first end of said transportation roller.

* * * * *